United States Patent
Sun et al.

(10) Patent No.: US 11,379,478 B2
(45) Date of Patent: Jul. 5, 2022

(54) OPTIMIZING A JOIN OPERATION

(71) Applicant: INTERNATIONAL BUSINESS MACHINES CORPORATION, Armonk, NY (US)

(72) Inventors: ShengYan Sun, BeiJing (CN); Peng Hui Jiang, Beijing (CN); Shuo Li, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/838,162

(22) Filed: Apr. 2, 2020

(65) Prior Publication Data

US 2021/0311945 A1 Oct. 7, 2021

(51) Int. Cl.
*G06F 16/24* (2019.01)
*G06F 16/2453* (2019.01)
*G06F 16/22* (2019.01)
*G06F 16/28* (2019.01)

(52) U.S. Cl.
CPC .... *G06F 16/24544* (2019.01); *G06F 16/2264* (2019.01); *G06F 16/2282* (2019.01); *G06F 16/282* (2019.01); *G06F 16/283* (2019.01)

(58) Field of Classification Search
CPC .............................................. G06F 16/24544
USPC ......................................................... 707/714
See application file for complete search history.

(56) References Cited

U.S. PATENT DOCUMENTS

| 7,565,342 | B2 | 7/2009 | Fuh et al. |
| 9,792,328 | B2 | 10/2017 | Cheng |
| 10,229,129 | B2 | 3/2019 | Chen et al. |
| 10,282,361 | B2 | 5/2019 | Subramanian et al. |
| 2007/0136323 | A1* | 6/2007 | Zurek .................. G06F 16/283 |
| 2008/0243966 | A1 | 10/2008 | Croisettier et al. |

(Continued)

FOREIGN PATENT DOCUMENTS

KR 101772333 B1 8/2017

OTHER PUBLICATIONS

Thomas Stohr, et al., Multi-Dimensional Database Allocation for Parallel Data Warehouses, Source: Research Gate, Jan. 2000, Retrieved from: https://www.researchgate.net/publication/221310508, pp. 273-284.

(Continued)

*Primary Examiner* — Syling Yen (74) *Attorney, Agent, or Firm* — Schmeiser, Olsen & Watts, LLP; Stephanie Carusillo (57) ABSTRACT

An approach is provided for optimizing a join operation that includes receiving, by one or more processors of a computer system, a join request associated with a fact table and a plurality of related dimension tables; identifying, by the one or more processors of the computer system, a join relationship from the fact table and the plurality of related dimension tables; matching, by the one or more processors of the computer system, different tables of the fact table and the plurality of related dimension tables; filtering, by the one or more processors of the computer system using data parallelism, the fact table and the plurality of related dimension tables, wherein the filtering occurs prior to performing the join request; and performing, by the one or more processors of the computer system, the join operation pursuant to the join request.

14 Claims, 10 Drawing Sheets

(56) References Cited

U.S. PATENT DOCUMENTS

| | | | |
|---|---|---|---|
| 2014/0032506 A1 | 1/2014 | Hoey et al. | |
| 2016/0371288 A1* | 12/2016 | Le Biannic | G06F 16/90324 |
| 2017/0116426 A1* | 4/2017 | Pattabhiraman | G06Q 10/10 |
| 2018/0300330 A1 | 10/2018 | Samwel | |
| 2018/0349463 A1* | 12/2018 | Bernhardy | G06F 16/9017 |
| 2019/0095486 A1* | 3/2019 | Hopeman, IV | G06F 16/283 |
| 2019/0318272 A1* | 10/2019 | Sassin | G06N 20/00 |

OTHER PUBLICATIONS

Mell, Peter et al.; "The NIST Definition of Cloud Computing;" National Institute of Standards and Technology; Special Publication 800-145; Sep. 2011; 7 pages.

Davidvgalbraith, Orestes: a Time Series Database Backed by Cassandra and Elasticsearch, Apr. 7, 2016, davidvgalbraith.com/orestes, 8 pages.

* cited by examiner

OPTIMIZING A JOIN OPERATION

TECHNICAL FIELD

The present invention relates to systems and methods for data query analysis. More specifically, the invention relates to systems and methods for a join request on large-scale data query analysis.

BACKGROUND

In data warehouse applications and large-scale data query analysis, general analytics data models are commonly used, such as the star model or the snowflake model. These general analytics data models are used in both Structured Query Language (SQL) relationship databases and non-relational SQL (NoSQL) databases. For example, for transform efficiency, NoSQL raw data based on multiple small definition size log tables are naturally assigned different "fact tables" and "dimension tables." The typical star model contains a central fact table that often represents an event such as a sale or order. This central fact table is surrounded by the normalized dimension tables containing the attributes of those facts—such as a product dimension with product details, a store dimension, a time dimension, or the like. The challenge for query optimizers when dealing with very large fact tables is to efficiently process queries against such a data model when no single dimension alone provides adequate filtering, but a combination of dimensions may provide sufficient filtering based upon a user query. In a star model, these dimensions have no join relationships directly with each other, until the dimensions are brought together with fact table representing the event such as the sale or order.

SUMMARY

An embodiment of the present invention relates to a method, and associated computer system and computer program product for optimizing a join request. One or more processors of a computer system receive a join request associated with a fact table and a plurality of related dimension tables and identify a join relationship from the fact table and the plurality of related dimension tables. The one or more processors match different tables of the fact table and the plurality of related dimension tables and filter, using data parallelism, the fact table and the plurality of related dimension tables. The one or more processors perform a join operation pursuant to the join request, where the filtering occurs prior to performing the join request.

DETAILED DESCRIPTION

Embodiments of the present invention provide a new hybrid join operation to redefine the join relationship between different tables. With methods embodied by the present invention, a database can automatically match different tables independently and get filtered data parallelism before performing the join. The present invention can maximize use of parallel attributes of NoSQL and business relationships among the tables accordingly. The present invention may be configured to provide improved out-of-the-box or automatic query performance with a simplified index design, increased parallelism, and run-time adaptation when the actual filtering does not match the optimizer's estimates. Embodiments of the present invention are configured to process join-pairs (tables with join relationships) via a semi-join function from the dimension to the fact table index of a star model data warehouse application. Embodiments of the present invention then dynamically alter the dimensions that will have their fact table filtering intersected via index ANDing (applying as many conditions as possible on each of multiple indexes that are accessed). Embodiments described herein may thus be configured to improve the performance of join operations, particularly in NoSQL databases storing large amounts of data.

Figure 1:
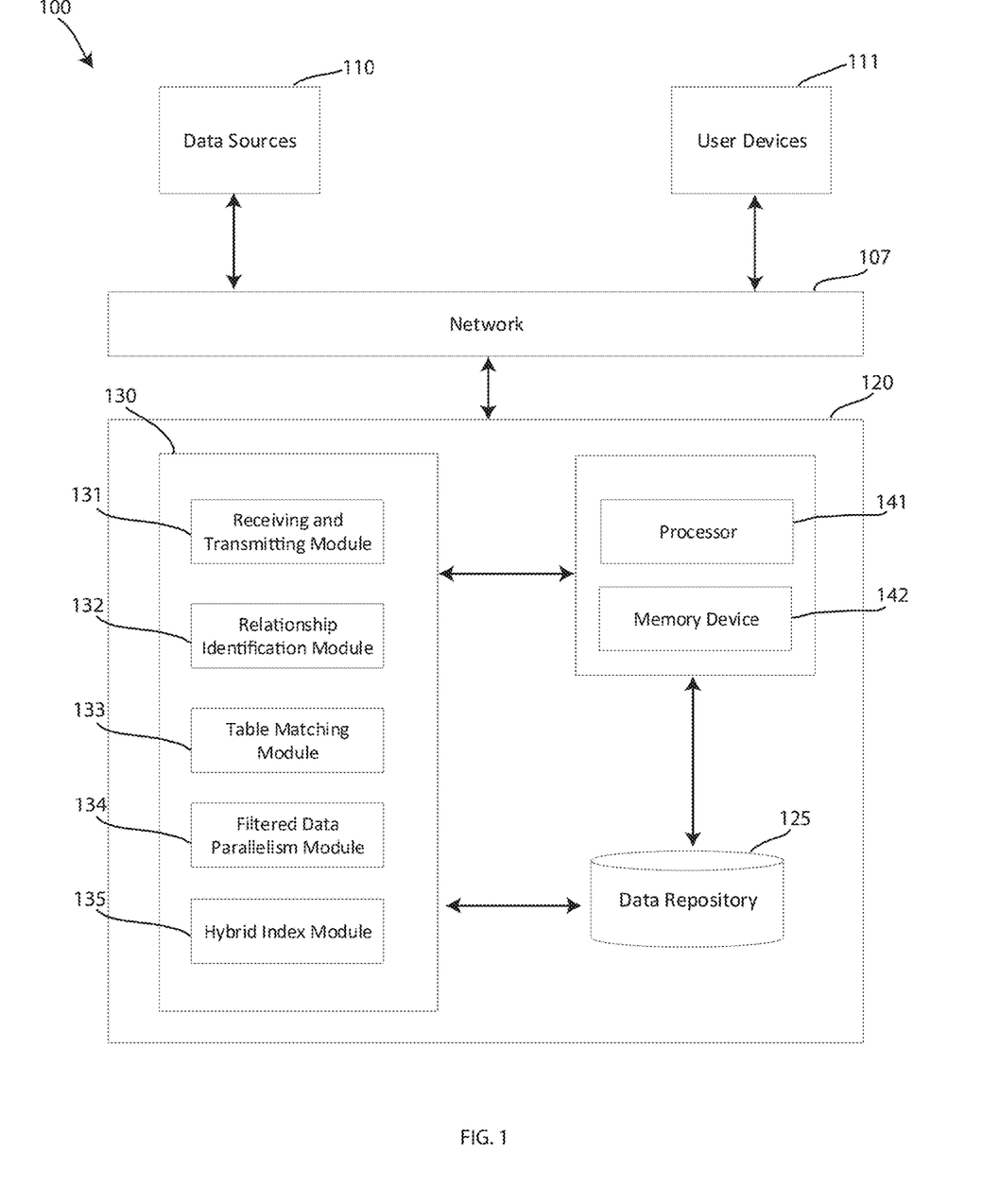
FIG. 1 depicts a block diagram of a system for optimizing a join operation, in accordance with embodiments of the present invention.

FIG. 1 depicts a block diagram of a system 100 for optimizing a join operation, in accordance with embodiments of the present invention. Embodiments of the system 100 for optimizing a join operation may be conducted by a computer system 120. Embodiments of the computing system 120 may be a computer system, a computer, a server, one or more servers, a cloud computing device, a hardware device, a remote server, and the like. The computer system 120 may support the function of storing NoSQL tables related via a star model or snowflake model. The computer system 120 may be configured to provide flexible schemas for the storage and retrieval of data beyond the traditional table structures found in relational databases. Examples of NoSQL databases storable on the computer system 120 may include open source databases, wide-column store databases, or the like. The computer system 120 may further represent a plurality of computer systems comprising one or more NoSQL databases in the event that the NoSQL databases are scaled across multiple data centers and run as a distributed system.

Furthermore, embodiments of system 100 for optimizing a join operation may include one or more data sources 110 and one or more user devices 111 communicatively coupled to the computing system 120 of the system 100 for optimizing a join operation over a network 107. Embodiments of the one or more data sources 110 of the system 100 for optimizing a join operation may be any source of data stored as a NoSQL database. The one or more data sources 110 may provide data to the computer system 120 that is stored as a NoSQL database either by a star or snowflake model. For example, the one or more data sources may provide business or enterprise data related to, for example, products, sales, orders or the like.

The network 107 may be a 4G, 5G and/or LTE based cellular data network or system. The network 107 may be a cloud network or system. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

Embodiments of the one or more user devices 111 may be a device operated by a user that is configured to interact with the computer system 120 and both provide information or inputs to the computer system 120 and receive outputs from the computer system 120. The one or more user devices 111 may be devices capable of interacting with the data stored in the computer system 120 and provide queries to the computer system 120 for processing. For example, the one or more user devices 111 may be configured to provide one or more join requests to the computer system 120 associated with the data stored in the computer system 120.

Embodiments of the computing system 120 include a module structure 130 that includes a receiving and transmitting module 131, a relationship identification module 132, a table matching module 133, a filtered data parallelism module 134, and a hybrid join index module 135. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving and transmitting module 131 may include one or more components of hardware and/or software program code for receiving and/or transmitting information and/or data from the one or more data sources 110 and the one or more user devices 111. The receiving and transmitting module 131 is configured to provide and interface for the interactions between the computer system 120, the one or more user devices 111, and the one or more data sources 110. The receiving and transmitting module 131 may be configured to receive user queries with the database of the computer system 120 from the one or more user devices 111. Specifically, the receiving and transmitting module 131 may further be configured to receive join requests by the one or more user devices. The receiving and transmitting module 131 may further be configured to receive and store data received from the one or more data sources 110.

Embodiments of the relationship identification module 132 may include one or more components of hardware and/or software program code for identifying a join relationship from a fact table and/or a plurality of related dimension tables. The relationship identification module 132 may be configured to automatically discover index attributes. The relationship identification module 132 may be further configured to create indexes on each table based on previous traffic analytics. With these general analytics processes, the relationship identification module 132 may be configured to automatically find out or otherwise determine relationships between fact and dimension tables stored by the computer system 120. Thus, the relationship identification module 132 may be configured to initially evaluate which dimension are likely to provide adequate filtering if chosen before the fact table, pursuant to a received join request.

Embodiments of the table matching module 133 may include one or more components of hardware and/or software program code for matching different tables of the fact table and the plurality of related dimension tables. The table matching module 133 is configured to determine which dimensions have a corresponding fact table index that supports matching. The table matching module 133 may be configured to match different tables independently.

Embodiments of the filtered data parallelism module 134 may include one or more components of hardware and/or software program code for filtering, using data parallelism, the fact table and the plurality of related dimension tables. The filtered data parallelism module 134 may be configured to perform this filtering prior to performing the join method pursuant to a join request. The filtered data parallelism module 134 may be configured to evaluate which dimensions from the plurality of related dimension tables are likely to provide adequate filtering prior to the performing of the join operation by the hybrid index join module 135 pursuant to the join request. The filtered data parallelism module 134 may be configured to dynamically alter the dimensions that will have their fact table filtering intersected via index ANDing (applying as many conditions as possible on each of multiple indexes that are accessed).

Embodiments of the hybrid index join module 135 may include one or more components of hardware and/or software program code for performing a join method pursuant to a join request in conformity with the methodology described herein. Thus, the hybrid index join module 135 may be configured to perform the join method pursuant to a join request as described herein after filtering with the filtered data parallelism module 134 and thereby may be configured to look back to skip unnecessary data. The hybrid index join module 135 may be configured to determine, build, and optimize a join query or request on a NoSQL database.

Further, embodiments of the computing system 120 may be equipped with a memory device 142 which may store various data/information/code, and a processor 141 for implementing the tasks associated with the system 100 for optimizing a join operation and perform processing associated with the functionality of the module structure 130.

Figure 2:
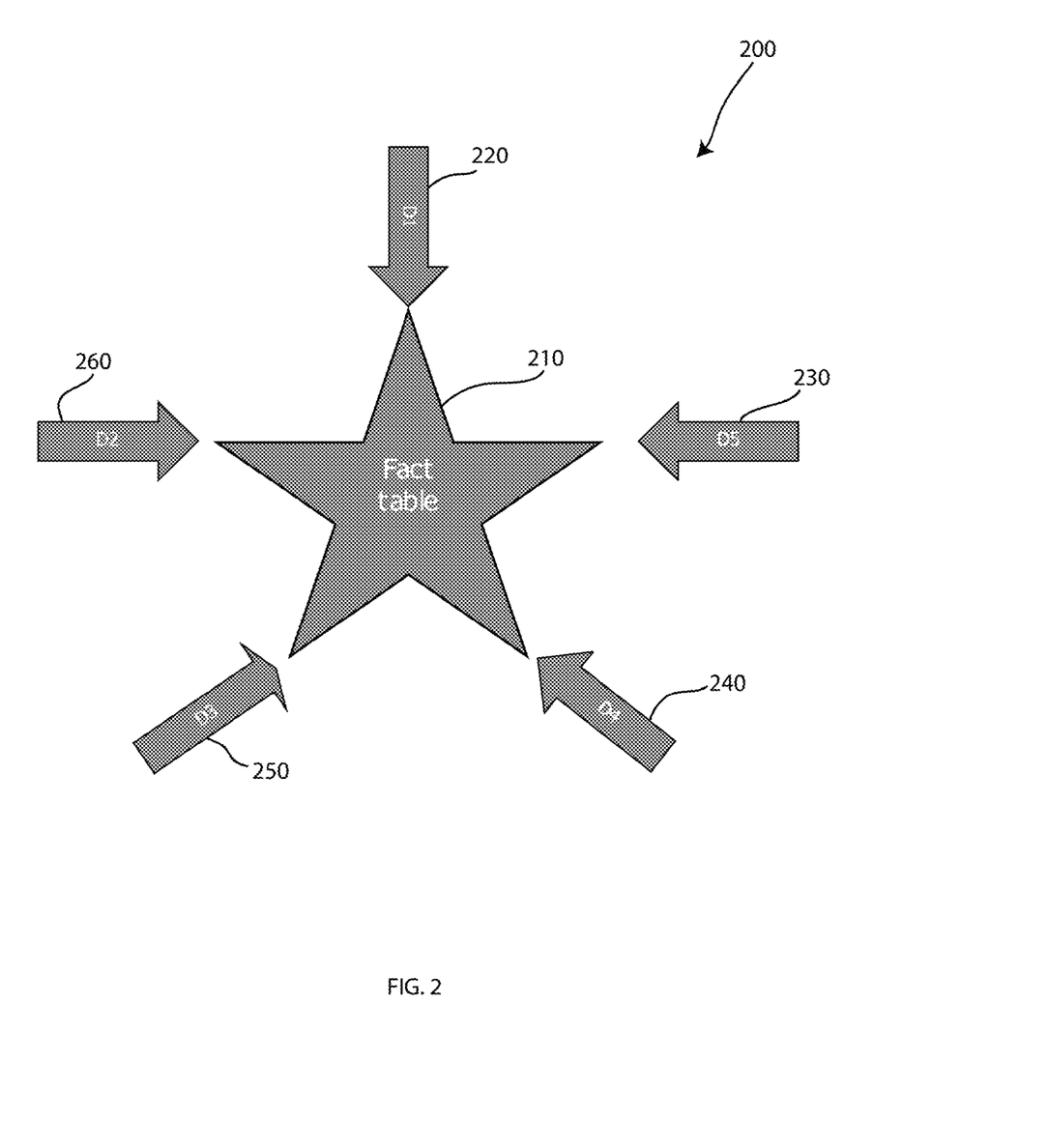
FIG. 2 depicts a schematic of a star model of a NoSQL database, in accordance with embodiments of the present invention.

FIG. 2 depicts a schematic of a star model 200 of a NoSQL database, in accordance with embodiments of the present invention. The star module 200 includes a fact table 210. The fact table 210 may include data related to a specific event. The fact table 210 may include numeric values. The fact table 210 may be designed to a low level of uniform detail and may include a large amount of data. The fact table 210 may be a transaction fact table related to a specific event, a snapshot fact table related to a given point in time, or an accumulating snapshot table recording aggregate facts over a given time. The fact table 210 may include data organized in a plurality of rows.

The fact table 210 is connected to a plurality of dimension tables 220, 230, 240, 250, 260. The dimensions tables 220, 230, 240, 250, 260 may each relate to a separate dimension, such as a time dimension, a geography dimension, a product dimension, an employee dimension, a range dimension, or the like. While not shown, embodiments of the present invention may be applied to a snowflake model whereby one or more of the dimension tables 220, 230, 240, 250, 260 are connected to one or more additional sub-dimension tables relating to more data on a type of data found in one or more of the dimension tables 220, 230, 240, 250, 260.

Figure 3:
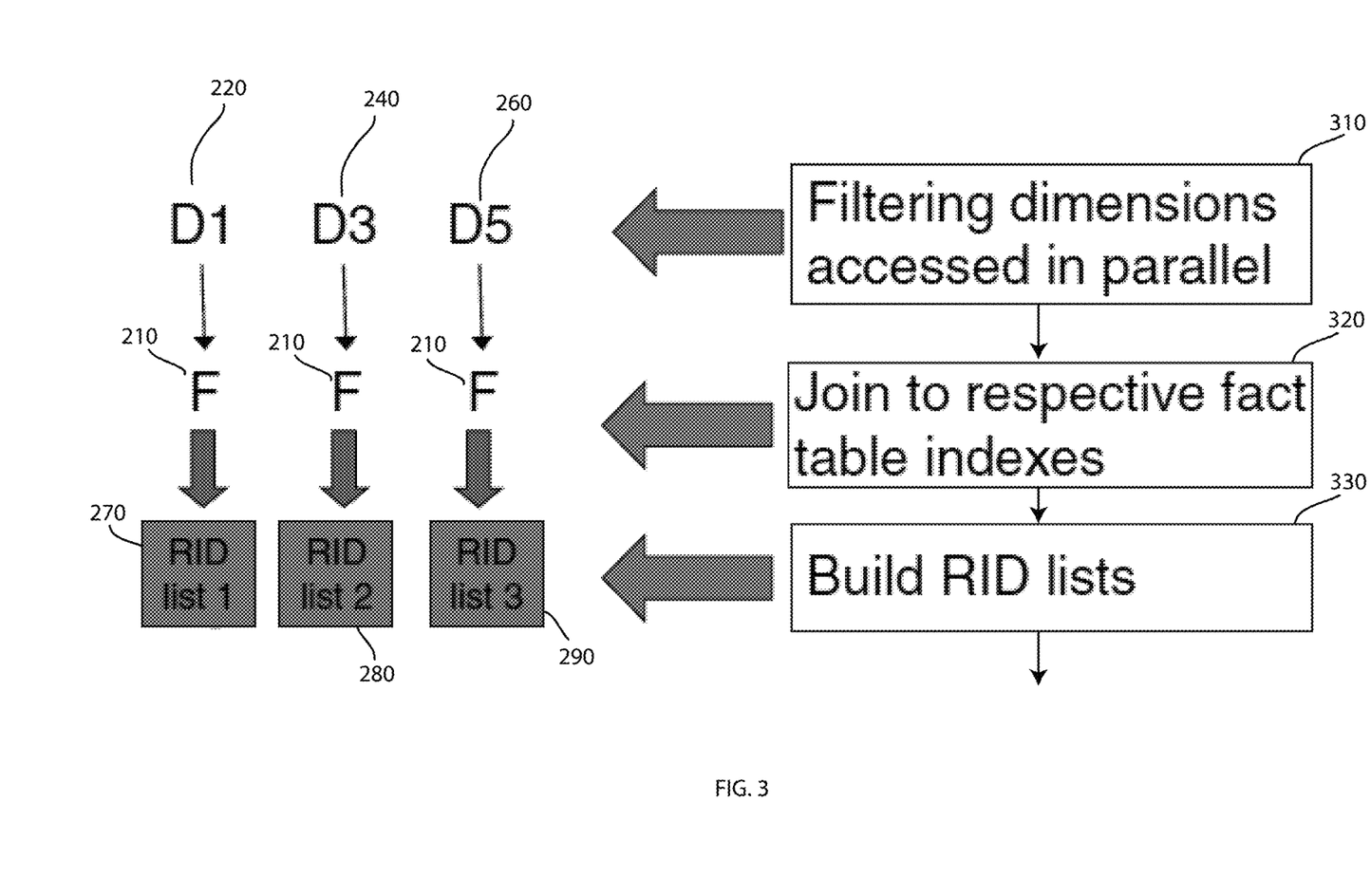
FIG. 3 depicts a schematic of the processes of building row ID lists from dimensions having been accessed and filtered in parallel and joined to fact table indexes, in accordance with embodiments of the present invention.

FIG. 3 depicts a schematic of the processes of building row ID (RID) lists (e.g. _id or uuid in NoSQL applications) from dimensions having been accessed and filtered in parallel and joined to fact table indexes, in accordance with embodiments of the present invention. As shown, the computer system 120 has evaluated which dimensions are likely to provide adequate filtering if chosen before the fact table. Of the dimensions 220, 230, 240, 250, 260, the dimensions 220, 240, 260 has been found to have a corresponding fact table index that supports matching index access. Filtering the dimensions 220, 240, 260 accessed in parallel at a step 310 and joined to respective fact table indexes 210 at a step 320 to build respective RID lists 270, 280, 290 in parallel at a step 330.

Figure 4:
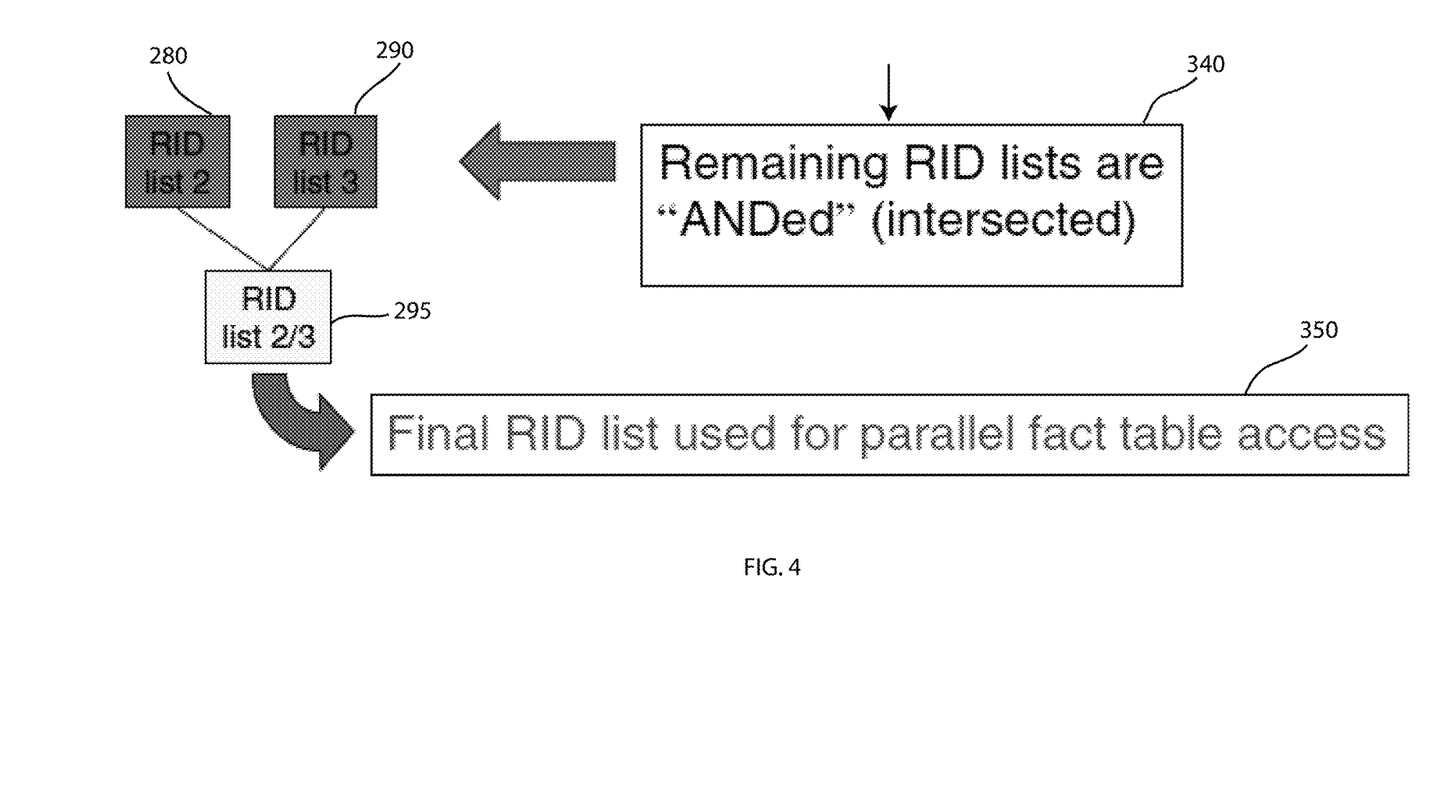
FIG. 4 depicts a schematic of the processes of intersecting remaining row ID lists, in accordance with embodiments of the present invention.

FIG. 4 depicts a schematic of the processes of intersecting remaining row ID lists, in accordance with embodiments of the present invention. As shown, the RID lists 280, 290 are ANDed (intersected) at a step 340 (which occurs after the step 330 in FIG. 3), to create a combined RID list 295 that can be used for parallel fact table access at a step 350.

Thus, in accordance with FIGS. 3 and 4, the RID from each join to the fact table index may be intersected in pairs. The first pair of RID lists are intersected, and the result of that intersection may be paired with the next RID list and so on, until all viable dimension filtering is intersected. This access method requires separate indexes on the fact table that support each individual filtering dimension tables of the star schema.

Figure 5:
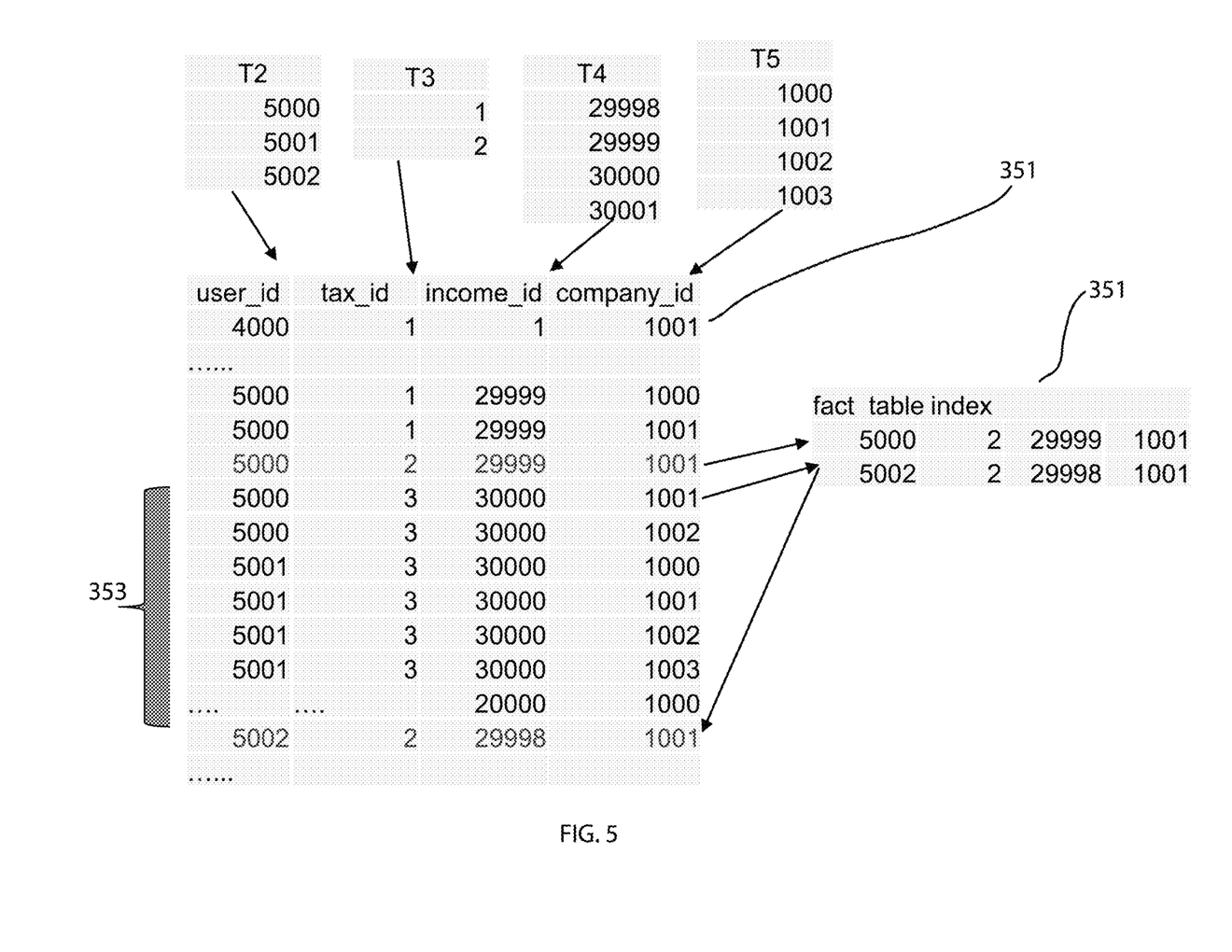
FIG. 5 depicts an example of a look-back step performable by the system for optimizing a join operation of FIG. 1, in accordance with embodiments of the present invention.

FIG. 5 depicts an example of a look-back step performable by the system for optimizing a join operation of FIG. 1, in accordance with embodiments of the present invention. Dimensions T2, T3, T4 and T5 are shown each corresponding to user_id, tax_id, income_id and company_id, in a fact table 351, respectively. Each of these dimensions includes various possible data (e.g. for user_id dimension T2, the data comprises the inputs 5000, 5001, and 5002). A fact table index 352 is shown, in which only two rows are included. This fact table index 352 is utilized in the look-back step in order to skip the unnecessary dimension combinations data contained in the fact table 351. As shown, unnecessary dimensions 353 are skipped utilizing the fact table index 352 during the filtering.

Figure 6:
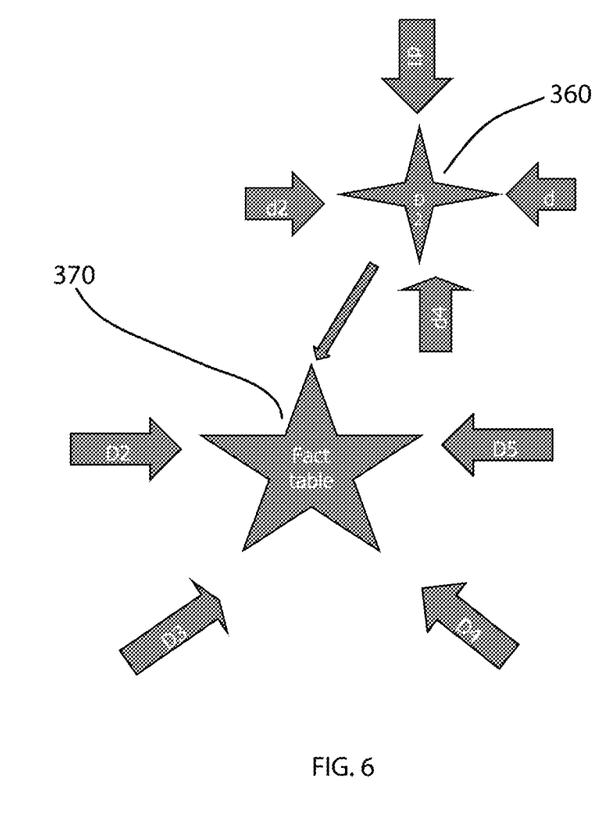
FIG. 6 depicts an example of a drill-down step performable by the system for optimizing a join operation of FIG. 1, in accordance with embodiments of the present invention.

FIG. 6 depicts an example of a drill-down step performable by the system 100 for optimizing a join operation of FIG. 1, in accordance with embodiments of the present invention. If, for a special dimension table 360, there is a condition and dimension to join with the special dimension table 360, the join operation may drill down and do filtering on the special dimension table 360 as another fact table to extract data first into a fact table 370. In this example, the following collection data structures may be used:

Collection A Data Structure:

```
{ "_id" : {
    "first_name" : "Anne",
    "last_name": "Grence",
    "income_yy": 23.5,
    "version" : 2},
    "value: 1}
```

Collection B Data Structure:

```
{          "user_id" : 12630,
           "username" : "Anne.Grence",
           "company": "Fox"}
```

Collection C Data Structure:

```
{          "user_id" :12630,
           "income_yy_b" : "20",
           "tax_level": 2}
```

In this example, the following left outer join may be performed with a $lookup join:

```
{"$lookup" :
    {"localField": "user_id",
    "from": "A",
    "foreignField": "_id",
    "as": "userinfo" }
}
```

The $lookup stage may add a new array field whose elements are matching documents from the joined collection. Next, the following aggregations may be performed:

```
db.post.aggregate([
{ "$match": { "income_yy": 23.5} },
{ "$sort": { "lastname": −1 } },
{ "$lookup" :
    { "localField": "user_id",
    "from": "A",
    "foreignField": "_id",
    "as": "userinfo" } },
{ "$unwind": "$userinfo" },
{ "$project": {
    "tax_level": 1
    "company": "1"
    "userinfo.income_first_name" : 1,
    "userinfo.last_name" : 1,
    "userinfo.income_yy"}
] ) ;
```

The result sample of the above example may be, for example:

```
[          {"tax_level" : 2
           "company": "Fox"
           "userinfo.income_first_name" : "Anne",
           "userinfo.last_name" : "Grence",
           "userinfo.income_yy": 23.5
           }
           {tax_level": 3
           "company": "HuaYi"
           "userinfo.income_first_name" : "ZiYi"
           "userinfo.last_name" : "Zhang",
```

```
        "userinfo.income_yy": 33.5
    }
]    ...
```

It should be understood that the above provides an example of drilling down and obtaining feedback to arrive at a result in accordance with embodiments of the present invention, but the invention is not limited by this example.

Figure 7:
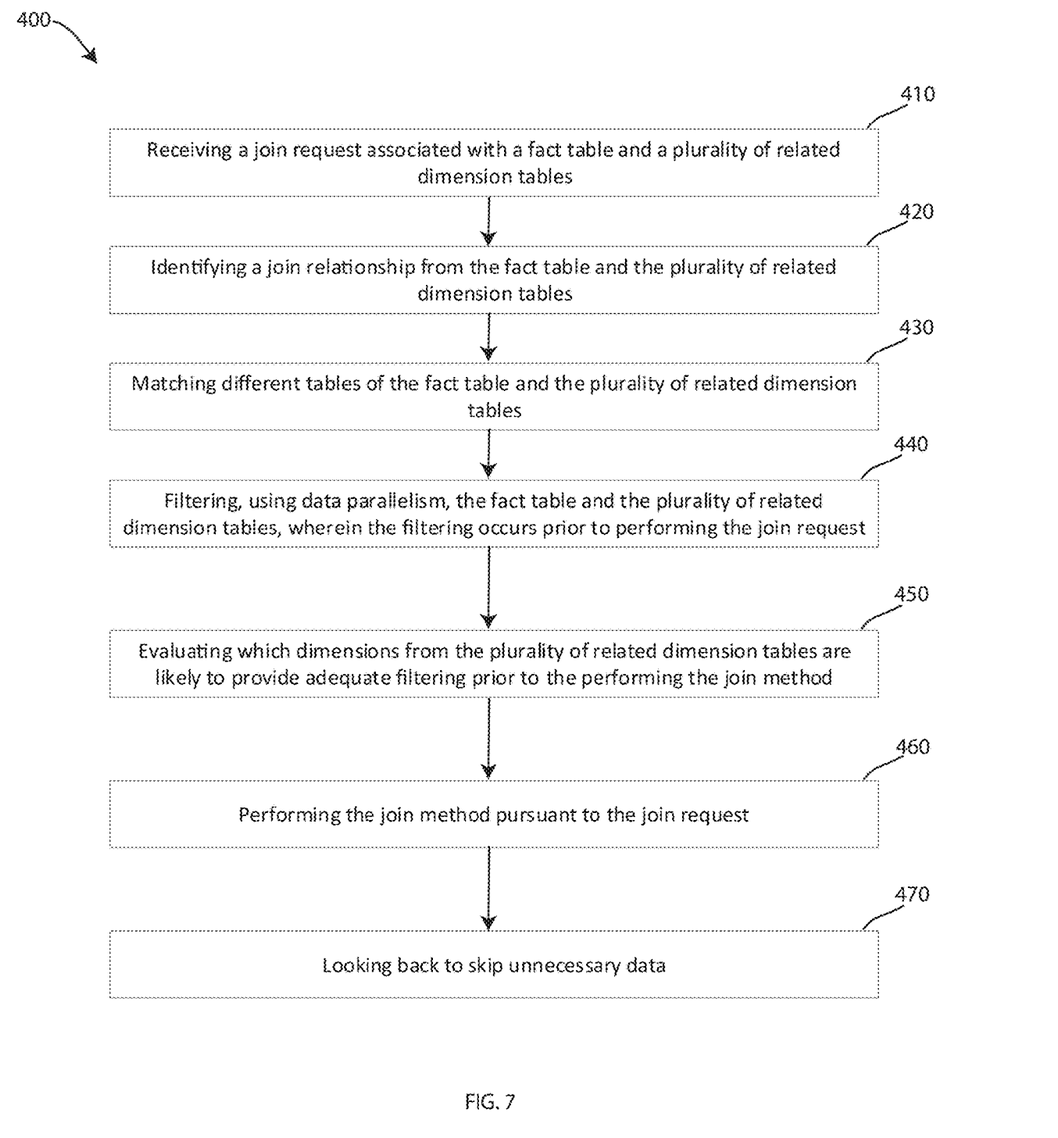
FIG. 7 depicts a method for optimizing a join operation, in accordance with embodiments of the present invention.

FIG. 7 depicts a method 400 for optimizing a join operation, in accordance with embodiments of the present invention. The method 400 includes a first step 410 of receiving a join request associated with a fact table and a plurality of related dimension tables. The fact table and the plurality of related dimension tables may comprise either a star model or a snowflake model. The fact table and the plurality of related dimension tables may include a NoSQL database where the join request is a NoSQL join request. The method 400 includes a second step 420 of identifying a join relationship from the fact table and the plurality of related dimension tables. The method 400 includes a third step 430 of matching different tables of the fact table and the plurality of related dimension tables. The matching may be based on a NoSQL query. The method 400 includes a fourth step 440 of filtering, using data parallelism, the fact table and the plurality of related dimension tables, wherein the filtering occurs prior to performing the join request. The method 400 includes a fifth step 450 of evaluating which dimensions from the plurality of related dimension tables are likely to provide adequate filtering prior to the performing the join operation. The method 400 includes a sixth step 460 of performing the join operation pursuant to the join request. Finally, the method 400 includes a seventh step 470 of looking back to skip unnecessary data.

Figure 8:
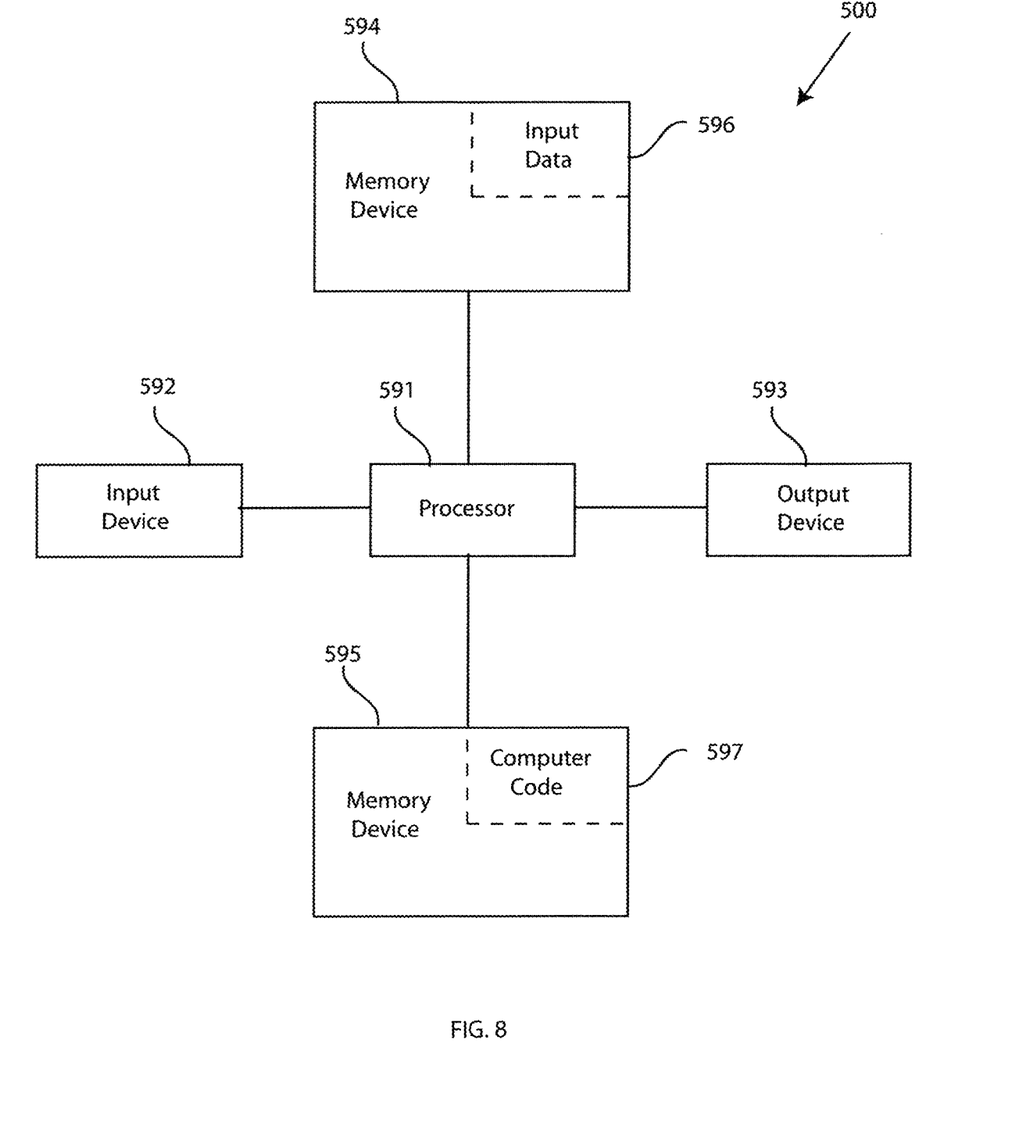
FIG. 8 depicts a block diagram of an exemplary computer system that may be included in the system for optimizing a join operation of FIG. 1, capable of implementing process flows and methods for optimizing a join operation of FIGS. 3-7, in accordance with embodiments of the present invention.

FIG. 8 depicts a block diagram of an exemplary computer system that may be included in the system 100 for optimizing a join operation of FIG. 1, capable of implementing methods and process flows for optimizing a join operation of FIGS. 3-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing method and processes for optimizing a join operation in the manner prescribed by the embodiment of FIGS. 3-7 using one, some or all of the system 100 for optimizing a join operation of FIG. 1, wherein the instructions of the computer code 597 may be executed by processor 591 via memory device 595. The computer code 597 may include software or program instructions that may implement one or more algorithms for implementing the methods and processes for optimizing a join operation, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from one or more computer data storage units (not shown). The one or more computer data storage units include a known computer-readable storage medium, which is described below. In one embodiment, the one or more computer data storage units may be a non-volatile data storage device, such as a magnetic disk drive (i.e., hard disk drive) or an optical disc drive (e.g., a CD-ROM drive which receives a CD-ROM disk). In other embodiments, the one or more computer data storage unit may include a knowledge base or data repository 125, such as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform the method for optimizing a join operation. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for optimizing a join operation. Thus, the present invention discloses a process for supporting, deploying and/or integrating computer infrastructure, integrating, hosting, maintaining, and deploying computer-readable code into the computer system 500, wherein the code in combination with the computer system 700 is capable of performing a method for optimizing a join operation.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
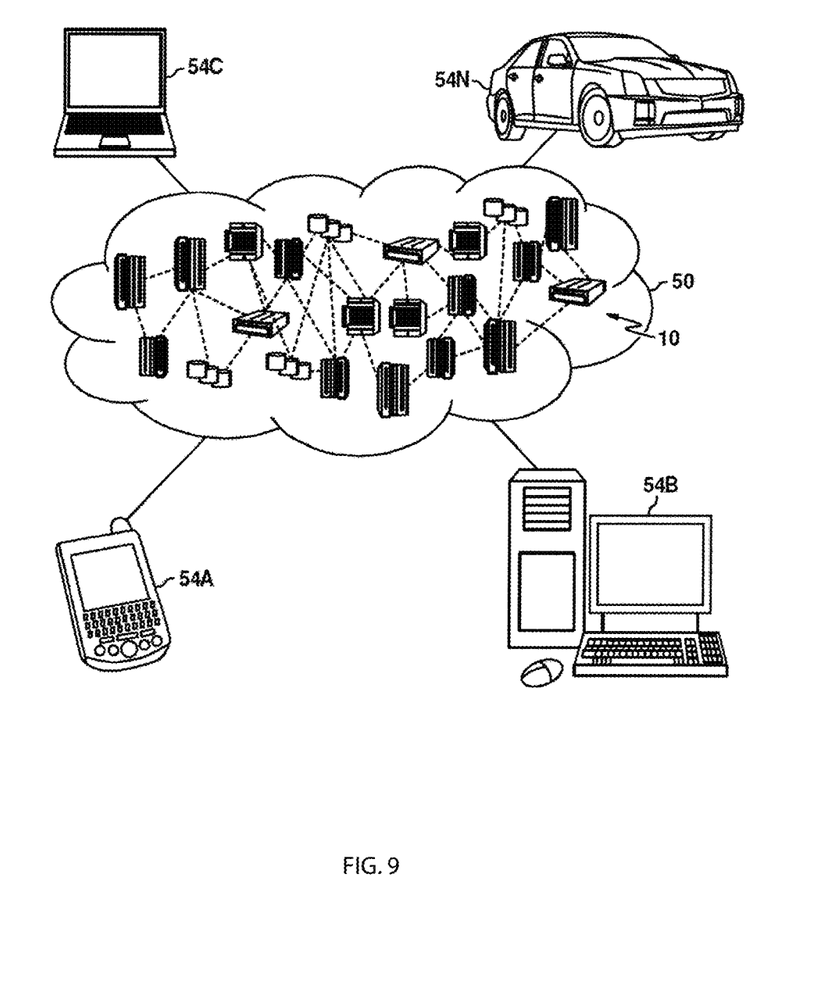
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
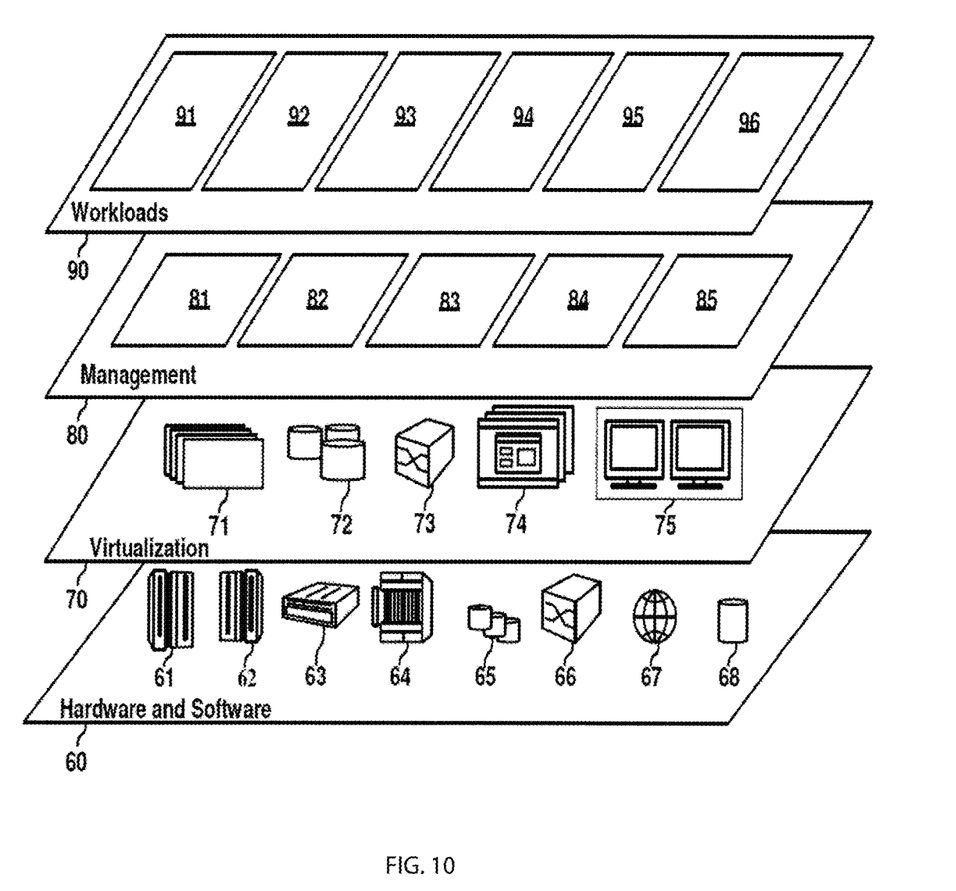
FIG. 10 depicts abstraction model layers, in accordance with embodiments of the present invention.

Referring now to FIG. 10, a set of functional abstraction layers provided by cloud computing environment 50 (see FIG. 9) are shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing a join operation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing a join operation, the method comprising:
   receiving, by one or more processors of a computer system, a join request associated with a fact table and a plurality of related dimension tables, wherein the fact table and the plurality of related dimension tables comprise a NoSQL database, and wherein the join request is a NoSQL join request;
   identifying, by the one or more processors of the computer system, a join relationship from the fact table and the plurality of related dimension tables;
   matching, by the one or more processors of the computer system, different tables of the fact table and the plurality of related dimension tables, wherein the matching is based on a NoSQL query;
   filtering, by the one or more processors of the computer system using data parallelism, the fact table and the plurality of related dimension tables, wherein the filtering includes drilling down, by the one or more processors of the computer system, on a special dimension table of the plurality of dimension tables as another fact table to extract data into the fact table, and wherein the filtering occurs prior to performing the join operation;
   performing, by the one or more processors of the computer system, the join operation pursuant to the join request; and
   transmitting, by the one or more processors of the computer system, joined data after the performed join operation.

2. The method of claim 1, wherein the performing the join operation comprises:
   looking back, by the one or more processors of the computer system, to skip unnecessary data.

3. The method of claim 1, wherein the filtering comprises:
   evaluating, by the one or more processors of the computer system, which dimensions from the plurality of related dimension tables are likely to provide adequate filtering prior to the performing the join operation.

4. The method of claim 1, wherein the fact table and the plurality of related dimension tables comprise a star model.

5. The method of claim 1, wherein the fact table and the plurality of related dimension tables comprise a snowflake model.

6. A computer system, comprising:
   one or more processors;
   one or more memory devices coupled to the one or more processors; and
   one or more computer readable storage devices coupled to the one or more processors, wherein the one or more storage devices contain program code executable by the one or more processors via the one or more memory devices to implement a method for optimizing a join operation, the method comprising:
   receiving, by the one or more processors of the computer system, a join request associated with a fact table and a plurality of related dimension tables, wherein the fact table and the plurality of related dimension tables comprise a NoSQL database, and wherein the join request is a NoSQL join request;

identifying, by the one or more processors of the computer system, a join relationship from the fact table and the plurality of related dimension tables;

matching, by the one or more processors of the computer system, different tables of the fact table and the plurality of related dimension tables, wherein the matching is based on a NoSQL query;

filtering, by the one or more processors of the computer system using data parallelism, the fact table and the plurality of related dimension tables, wherein the filtering includes drilling down, by the one or more processors of the computer system, on a special dimension table of the plurality of dimension tables as another fact table to extract data into the fact table, and wherein the filtering occurs prior to performing the join operation;

performing, by the one or more processors of the computer system, the join operation pursuant to the join request; and transmitting, by the one or more processors of the computer system, joined data after the performed join operation.

7. The computer system of claim 6, wherein the performing the join operation comprises:

looking back, by the one or more processors of the computer system, to skip unnecessary data.

8. The computer system of claim 6, wherein the filtering comprises:

evaluating, by the one or more processors of the computer system, which dimensions from the plurality of related dimension tables are likely to provide adequate filtering prior to the performing the join operation.

9. The computer system of claim 6, wherein the fact table and the plurality of related dimension tables comprises a star model.

10. The computer system of claim 6, wherein the fact table and the plurality of related dimension tables comprises a snowflake model.

11. A computer program product, comprising one or more computer readable hardware storage devices storing a computer readable program code, the computer readable program code comprising an algorithm that when executed by one or more processors of a computing system implements a method for optimizing a join operation, the method comprising:

receiving, by the one or more processors of the computer system, a join request associated with a fact table and a plurality of related dimension tables, wherein the fact table and the plurality of related dimension tables comprise a NoSQL database, and wherein the join request is a NoSQL join request;

identifying, by the one or more processors of the computer system, a join relationship from the fact table and the plurality of related dimension tables;

matching, by the one or more processors of the computer system, different tables of the fact table and the plurality of related dimension tables, wherein the matching is based on a NoSQL query;

filtering, by the one or more processors of the computer system using data parallelism, the fact table and the plurality of related dimension tables, wherein the filtering includes drilling down, by the one or more processors of the computer system, on a special dimension table of the plurality of dimension tables as another fact table to extract data into the fact table, and wherein the filtering occurs prior to performing the join operation;

performing, by the one or more processors of the computer system, the join operation pursuant to the join request; and transmitting, by the one or more processors of the computer system, joined data after the performed join operation.

12. The computer program product of claim 11, wherein the performing the join operation comprises:

looking back, by the one or more processors of the computer system, to skip unnecessary data.

13. The computer program product of claim 11, wherein the filtering comprises:

evaluating, by the one or more processors of the computer system, which dimensions from the plurality of related dimension tables are likely to provide adequate filtering prior to the performing the join request.

14. The computer program product of claim 11, wherein the fact table and the plurality of related dimension tables comprise a star model of a NoSQL database.

* * * * *